United States Patent
Sweeney et al.

[15] 3,681,413
[45] Aug. 1, 1972

[54] QUATERNARY AMMONIUM COMPOUNDS

[72] Inventors: Richard F. Sweeney, Dover; Alson K. Price, Morristown, both of N.J.

[73] Assignee: Allied Chemical Corporation, New York, N.Y.

[22] Filed: May 9, 1969

[21] Appl. No.: 823,520

[52] U.S. Cl. ............... 260/404.5, 260/400, 260/408, 260/456 R, 260/501.13, 260/501.15, 260/561 HL, 252/2, 252/7, 252/8.75, 252/8.57, 252/8.8, 252/DIG. 7, 106/2, 117/127, 117/134, 117/138, 117/8 B, 117/139.5, 117/142, 117/154, 117/167
[51] Int. Cl. ............................................. C09f 5/00
[58] Field of Search ...... 260/501.13, 404.5, 567.6 M, 260/567.6 B, 567.6 R

[56] References Cited

UNITED STATES PATENTS 3,147,065  9/1964  Koshar et al. ......... 260/567.6 M
3,409,647  11/1968  Pittman et al. ............. 260/404.5

Primary Examiner—Leon Zitver
Assistant Examiner—Michael W. Glynn
Attorney—Jay P. Friedenson

[57] ABSTRACT

Quaternary ammonium derivatives of polyfluoroisoalkoxyalkanamides characterized by having a fluorinated terminal group wherein an ether oxygen atom links a fluorinated carbon atom attached to two fluoroalkyl groups and at least one —$CF_2$— group. These compounds are useful as surface active agents, as oil repellency agents, and as additives to dry powder fire extinguishing compositions.

9 Claims, No Drawings

QUATERNARY AMMONIUM COMPOUNDS

This invention relates to novel fluorocarbon compounds. More particularly, this invention relates to quaternary ammonium derivatives of fluorinated amides which are useful as oil repellency agents and surface active agents.

The compounds of the invention have the formula (1) 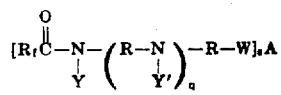

wherein $R_f$ is a polyfluoroisoalkoxyalkyl radical of the formula

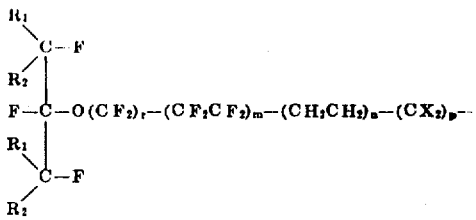

wherein $R_1$ and $R_2$ independently at each occurrence can be fluorine, chlorine, perfluoroalkyl or together can form a cyclic perfluoroalkylene group with the proviso that both $R_1$ and $R_2$ cannot be chlorine; $m$ and $n$ are integers from 0–20; the sum of $m$ and $n$ is 1–20; $r$ is an integer from 0–1 and is always 0 when the sum of $m$, $n$, and $p$ is greater than 0 and is always 1 when the sum of $m$, $n$, and $p$ is 0; $p$ is an integer from 0–1; $X$ can be hydrogen or fluorine with the proviso that when $n$ is greater than zero, $X$ must be hydrogen; $Y$ can be hydrogen or alkyl of one to six carbon atoms; $q$ is an integer from 0–2; $R$ independently at each occurrence is an alkylene group, which can be straight or branched chain of one to six carbon atoms; $Y'$ independently at each occurrence can be hydrogen, alkyl or hydroxyalkyl of one to six carbon atoms, acyl of the formula

wherein $R_f$ has the meaning given above, or

wherein R and Y have the meanings given above and Z is hydrogen, alkyl of one to six carbon atoms, or acyl of the formula

wherein $R_f$ has the meaning given above; W is a quaternary ammonium radical, A is an accompanying anion and $s$ is an integer from one to three and is equal to the negative charges of A. Preferably $m$ and $n$ are integers from 0–10.

The quaternary ammonium compounds are prepared by reacting a polyfluoroisoalkoxyalkanamide having a terminal tertiary amine group with an organic or mineral acid or other quaternizing agent, as hereinafter described.

The criticality in the structure of the above described compounds is in the polyfluoroisoalkoxyalkyl tail portion of the molecule wherein an ether oxygen atoms links a fluorinated carbon atom attached to two fluoroalkyl groups and at least one —$CF_2$— group.

The polyfluoroisoalkoxyalkanamide starting materials have the formula (2) 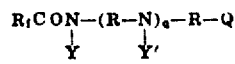

wherein $R_f$, Y, Y', R and $q$ have the meanings given above and Q is a tertiary amine which can be pyridyl, alkyl-substituted pyridyl and

radicals wherein $R_3$ and $R_4$ independently can be alkyl or hydroxyalkyl of one to six carbon atoms.

The polyfluoroisoalkoxyalkanamides are prepared by reaction of the polyamine and a polyfluoroisoalkoxyalkyl carboxylic acid of the formula (3) 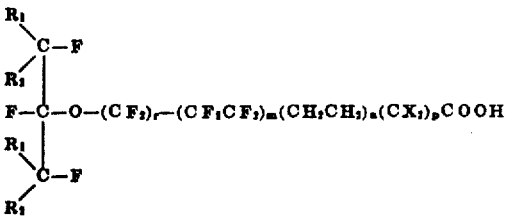

wherein $R_1$, $R_2$, $r$, $m$, $n$, $p$, and X have the meanings given above. The polyfluoroisoalkoxyalkanamides are described in greater detail in copending U.S. application of Price et al., titled "Fluorinated Amides," Ser. No. 749,302, filed Aug. 1, 1968. The pertinent subject matter of this application is hereby incorporated by reference.

The carboxylic acids of Formula (3) can be prepared from iodides of the formula:

(4) 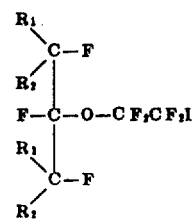

wherein $R_1$ and $R_2$ have the meanings given above. These iodides are prepared by reacting an appropriate ketone with an ionizable fluoride salt, e.g., CsF or KF, to form a fluorinated organic salt which is reacted with tetrafluoroethylene and iodine. The reaction between the ketone and the ionizable fluoride salt proceeds readily at room temperature and is best carried out under anhydrous conditions in the presence of an inert organic solvent such as acetonitrile or dimethyl formamide. The reaction between the fluorinated organic salt, with the olefin and a halogen also proceeds readily at room temperature and may be conducted in the same solvent medium as the first mentioned reaction. These reactions are described in greater detail in copending U.S. application of Litt et al., Ser. No. 492,276, filed Oct. 1, 1965 now U.S. Pat. No. 3,453,333 and Ser. No. 513,574, filed Dec. 13, 1965 now U.S. Pat. No. 3,470,256. The pertinent subject matter of these applications are hereby incorporated by reference.

The iodides of Formula (4) can be reacted with tetrafluoroethylene and/or ethylene to form the corresponding longer carbon chain iodides. These reactions can be initiated by heat, i.e., temperatures from about 100°–350° C., preferably 150°–200°C., or by a free radical initiator such as benzoyl peroxide or azobisisobutyronitrile. These reactions are described in greater detail in copending U.S. application of Anello et al., Ser. No. 633,359, filed Apr. 25, 1967 now U.S. Pat. No. 3,514,487. The pertinent subject matter of that application is hereby incorporated by reference.

The following series of equations will serve to further illustrate preparation of the iodides, wherein $R_1, R_2, Z_1-Z_{4a}, X_1-X_4, m$ and $n$ have the meanings given above.

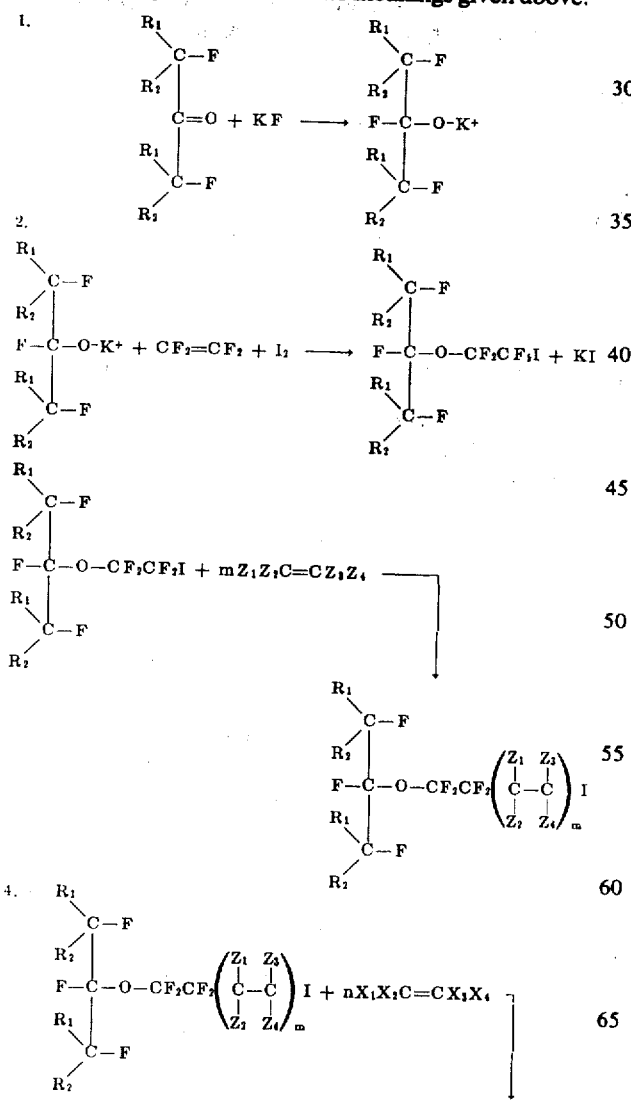

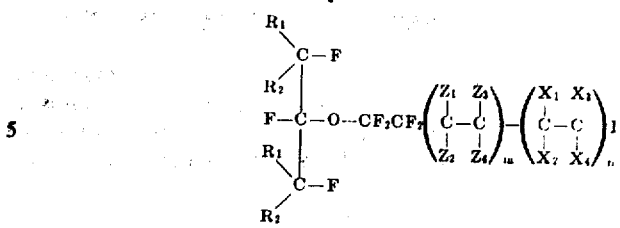

It will be understood that when $m$ and/or $n$ is 0, the applicable telomerization Equations 3 and/or 4 are omitted.

The carboxylic acids of Formula (3) can be prepared from the polyfluoroisoalkoxyalkyl iodides as hereinabove described in various ways.

Carboxylic acids of Formula (3) wherein $r$, $n$, and $p$ are 0 and $m$ is at least 2, can be prepared by reacting the appropriate iodide with ICN or $(CN)_2$ to form the nitrile at superatmospheric pressures of 20–200 atmospheres at temperatures above about 300°C. The nitrile can be hydrolyzed to the free acid by treatment with a mineral acid, i.e., HCl, $H_2SO_4$, $H_3PO_4$, and the like at temperatures of about 60°–125°C.

Carboxylic acids of Formula (3) wherein $r$ and $p$ are 0 and $n$ is at least one can be prepared by reaction of a suitable iodide with an alkali metal cyanide, preferably in alcoholic solution, at temperatures between about 60°–100°C. to form the nitrile, and hydrolyzing the nitrile as described above.

Carboxylic acids of Formula (3) wherein $r$ is 0, $m$ is at least 1, $p$ is 1 and X is hydrogen can be prepared by reacting a suitable iodide with either $SO_3$ to form the corresponding pyrosulfate or with oleum to form the corresponding hydrosulfate. The pyrosulfate or hydrosulfate can be hydrolyzed to the corresponding alcohol with aqueous acid. The alcohol can then be oxidized to form the free acid with dichromate, permanganate or strong nitric acid in known manner. The preparation of the alcohols is described in greater detail in copending U.S. application of Anello et al., Ser. No. 721,089, filed Apr. 12, 1968. The pertinent subject matter of this application is hereby incorporated by reference.

Carboxylic acids of Formula (3) wherein m is 0 or an integer, $r$ and $n$ are 0, $p$ is 1, and X is fluorine can be prepared by reacting suitable iodide with $SO_3$ to form the corresponding acid fluoride and fluoropyrosulfate and hydrolyzing with water to form the free acid.

Carboxylic acids of Formula (3) wherein $m$, $n$, and $p$ are 0 and $r$ is 2, can be prepared by reacting a suitable iodide with a Grignard reagent to form a magnesium halide adduct, reacting the adduct with $CO_2$ to form the magnesium halide salt and acidifying the salt to the free acid. Preparation of these carboxylic acids are described in greater detail in copending applications of Anello et al., Ser. Nos. 721,115 and 721,117, filed Apr. 12, 1968. The pertinent subject matter of these applications is hereby incorporated by reference.

The carboxylic acids as described above or their corresponding lower alkyl esters formed in known manner by reaction of the carboxylic acids with alkanols, are reacted with a polyamine containing from two to four nitrogen atoms, at least one primary or secondary amine group and a terminal tertiary amine group, at temperature between about 0°–200°C. When the free carboxylic acid is employed, temperatures of about 100°C. or more are generally employed but lower temperatures can be used when the ester is employed. The reaction can be carried out in the presence or absence of an inert solvent. Suitable inert solvents include either, dioxane, tetrahydrofuran, dimethylformamide, heptane, benzene and the like.

Suitable polyamines are well known and include for example 3-(N,N-dimethylamino)propylamine, 2-(N,N-dimethylamino)-ethylamine, 2-aminomethyl-6-methyl-pyridine, 2-amino-5-diethyl-aminopentane, 3-(4-methylaminobutyl)pyridine, 2-(β-methylamino-ethyl)pyridine, N,N,N-triethylethylenediamine and the like.

The quaternary ammonium compounds of the invention are prepared by reacting an amine of Formula (2) with a suitable quaternizing agent to form the corresponding salts. The compounds are characterized by a positively charged nitrogen atom attached to a polyfluoroisoalkoxyalkanamide group; to two lower alkyl, hydroxyalkyl or to two carbon atoms which are part of a pyridyl or alkyl-substituted pyridyl ring, corresponding to $R_3$ and $R_4$ described above; to a group contributed by the quaternizing agent which can be hydrogen, alkyl or the residue of a carboxylic acid or ester, and an anion contributed by the quaternizing agent. In the case where a lactone or sultone is employed as the quaternizing agent, the positively charged nitrogen atom is attached to a negatively charged group to form a compound having an inner salt structure.

Quaternizing agents are well known and conventional and include for example alkyl halides, haloacids and esters, alkyl sulfates, sultones, β-lactones, mineral acids and organic acids. The structure of the compounds of the invention will vary somewhat depending on the nature of the quaternizing agent. For example, when a compound of Formula (2) is reacted with an alkyl halide, such as methyl iodide, the resultant compound has the formula

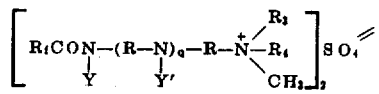

When a compound of Formula (2) is reacted with a mineral acid, such as hydrochloric acid, the resultant compound has the formula

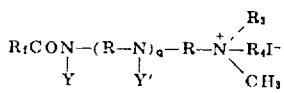

When a compound of Formula (2) is reacted with a β-lactone, such as β-propiolactone, the resultant compound has the formula

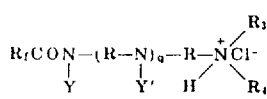

When a compound of Formula (2) is reacted with an excess of a compound giving a divalent anion such as dimethyl sulfate, the resultant compound has the formula

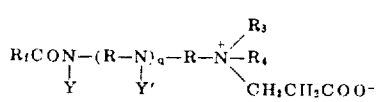

Suitable quaternizing agents include alkyl halides such as methyl iodide, methyl bromide, ethyl chloride and the like; haloacids such as chloroacetic acid, chloropropionic acid, chlorosuccinic acid and the like; haloacid esters such as chloroethyl acrylate and the like; alkyl sulfates such as dimethyl sulfate, diethyl sulfate and the like; sultones such as γ-propane sultone, θ-butane sultone and the like; β-lactones such as β-propiolactone and the like; mineral acids such as hydrochloric acid, hydroiodic acid, hydrofluoric acid, phosphoric acid and the like; organic acids such as acetic acid, succinic acid, benzoic acid and the like. Although a stoichiometric amount of the quaternary agent or acid is required for complete reaction, generally an excess will be employed.

The quaternization reaction can be carried out in the presence or absence of an inert solvent. Suitable solvents are diethyl ether, acetonitrile, dimethylformamide, N-methylpyrrolidone and the like.

The temperature of the reaction is not critical. When the polyfluoroisoalkoxyalkanamides are reacted with strong acids, such as hydrochloric acid, or a reactive quaternizing agent, such as methyl iodide, the reaction proceeds readily at ambient temperatures. When less reactive quaternizing agents are employed, such as chloroacetic acid, higher temperatures of about 100°–150°C. are preferred to increase the rate of reaction.

The resultant quaternary ammonium compounds are frequently obtained as solids when an inert solvent is employed. They can be readily separated, washed and dried. The products can be isolated from solution by addition of a nonsolvent, as will be known to one skilled in the art. The products can be employed as obtained or can be further purified if desired by recrystallization from an appropriate solvent or solvent mixture. Products obtained as viscous liquids can be further purified by extraction with a suitable solvent.

The preferred compounds of the invention have the formula:

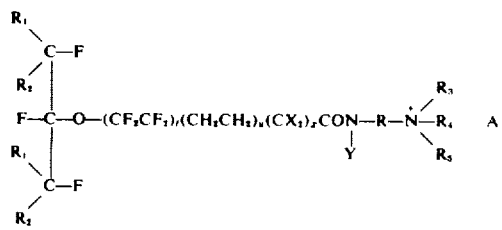

wherein $R_1$ and $R_2$ are fluorine or perfluoroalkyl of one to two carbon atoms, $t$ is an integer from 1–10, $u$ is an integer from 0–10, X can be hydrogen or fluorine and is hydrogen when $u$ is at least 1, $x$ can be 0 or 1, Y and R have the meanings given above, $R_3$ and $R_4$ independently can be alkyl or hydroxyalkyl of one to six carbon atoms or joined to form a pyridyl or alkyl-substituted pyridyl ring, $R_5$ can be hydrogen, alkyl or carboxyalkyl, and A is a halogen anion.

Preferred embodiments of compounds of the invention which have internal salt structures, as described above, are those in which $R_5$ and $A^-$ in the above formula are joined to form a radical of the formula — $(CH_2)_v A^-$ wherein $v$ is an integer from 1 to 6 and $A^-$ is a $—COO^-$ or $—SO_3^-$ group.

The quaternary ammonium derivatives of the present invention are useful oil repellents for a variety of substrates, including textiles, papers, plastics, metals, leather and the like and can be applied from aqueous or organic solution. They are useful both as internal or external sizes for paper.

The compounds of the invention are also highly effective surface active agents at low concentration. When added to water or aqueous solutions, these compounds lower the surface tension materially. They are also useful agents to lower the surface tension of organic solutions. Such solutions contain a variety of solvents including hydrocarbon solvents, such as benzene, toluene, xylene and the like; halogenated hydrocarbons such as trichloroethane or carbon tetrachloride; dimethyl formamide, dimethylsulfoxide and the like.

The compounds of the invention are useful as additives to dry powder fire extinguishing compositions. When such compounds are mixed with conventional dry powder fire extinguishing compounds, the novel compounds effect one or more of the following results: (a) enhances the fire extinguishing capabilities of the powder, (b) promotes the free flowability of the powder, (c) increases the compatibility of the powder with other fire extinguishing agents, and (d) serves an an anti-flashing agent to prevent reignition in the event flammable conditions become reestablished in the treated area.

Illustrative conventional dry powder fire extinguishing compounds include the following: sodium bicarbonate, potassium bicarbonate, magnesium bicarbonate, ammonium sulfate, ammonium phosphate, calcium carbonate and mineral barytes. A variety of other additives may be incorporated with these dry powder fire extinguishing compounds.

For best results, the novel compounds should be intimately mixed with the dry powder fire extinguishing components. This may be accomplished, for example, by grinding the dry fire extinguishing component or components and the novel compound together in a ball mill. Alternatively and preferably, these materials may be intimately mixed by a procedure which comprises dissolving the novel compound in an inert organic solvent, such as acetone or acetonitrile, slurrying the dry powder into the solvent, evaporating the solvent from the solution and then drying the product, for example, at 100°C. Additional grinding in a suitable mill may be desirable to optimize the free flowing characteristics of the powder. Whatever mixing means is employed, the novel compound forms a continuous or discontinuous layer or coating on the powder surfaces. It is theorized that this fluorochemical layer is desorbed from the dry powder during the fire fighting and forms a film on the surface of the volatile fuel. This serves to suppress the vaporization of the fuel, thereby tending to prevent reflashing of the fire if flammable conditions become reestablished.

The amount of novel compound is not critical and will vary depending on the particular compound chosen and the composition with which it is formulated. The optimum amount can be determined by routine experimentation. Generally, the novel compound should be used in at least about 0.1 percent by weight of the composition. For practical reasons, nothing is to be gained by using a composition of greater than 5 percent by weight of the novel compound.

The dry powder formulations containing the novel compounds may be applied in the conventional manner from containers pressurized with compressed air or carbon dioxide.

The invention can be illustrated further by the following examples, but it is to be understood that the invention is not meant to be limited to the details disclosed therein. In the examples, all parts and percentages are by weight unless otherwise noted.

EXAMPLE 1

Fifty parts of 6-heptafluoroisopropoxyperfluorohexyl iodide $(CF_3)_2CFO(CF_2CF_2)_3I$ and 26.2 parts of liquid sulfur trioxide were charged to a glass lined pressure vessel equipped with a pressure gauge and magnetic stirrer and connected to a dry ice-acetone trap. The gas space in the vessel was flushed with nitrogen, the vessel was sealed, and then heated at 142°C. for 34.5 hours. The reaction pressure reached 182 p.s.i.g. The vessel was cooled, vented, and the liquid products withdrawn. Two products were obtained upon fractional distillation of the mixture; 8.7 parts of the acid fluoride $(CF_3)_2CFO(CF_2)_5COF$ boiling at 63°–64°C./90 mm and 7.5 parts of the fluoropyrosulfate $(CF_3)_2CFO(CF_2)_6OSO_2OSO_2F$ boiling at 105°C./25 mm.

A mixture of 12.2 parts of $(CF_3)_2CFO(CF_2)_5COF$ and 10.8 parts of $(CF_3)_2CFO(CF_2)_6OSO_2OSO_2F$ prepared as above were cooled to 0°C. Twenty-six parts of methanol were added over a 20-minute period. The resultant mixture was heated at reflux for 19 hours, cooled to room temperature, and washed with ice water. The two layers were separated, the organic layer dried over anhydrous sodium sulfate, filtered, and distilled under reduced pressure.

The methyl ester (16 parts), $(CF_3)_2CFO(CF_2)_5COOCH_3$ was obtained. The structure was confirmed by infrared analysis.

The ester prepared as above (100 parts) was cooled to 0°–5°C. in an ice bath. 19.5 parts of 3-(N,N-dimethylamino)-propylamine were added dropwise while stirring, maintaining the temperature at about 40°C. The mixture was then stirred at room temperature for 4 hours. The reaction mixture was distilled under reduced pressure.

The corresponding amide, dimethylamino-n-propyl-perfluoro-(isopropoxypentanamide),

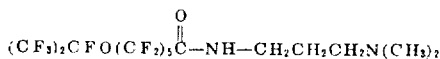

(96.7 parts) was obtained.

The amide prepared as above (8.2 parts) was dissolved in 18 parts by volume of ether and 3.9 parts of methyl iodide were added to the solution over a five minute period. The mixture was stirred for three hours and let stand for three days. The solid product was filtered, washed with ether and dried.

A 95 percent yield (9.45 parts) of 3[perfluoro(isopropoxypentane)-carboxamide]propyl trimethyl ammonium iodide having the formula

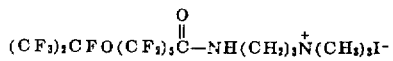

was obtained. The product, recrystallized from a mixture of benzene and ethanol, had a melting point of 143°–143.5°C. The structure was confirmed by infrared analysis which showed amide absorption at 3.0, 5.9 and 6.5 microns; C—H absorption at 3.3, 3.4, 6.71, 6.79 and 6.97 microns; C—F absorption at 7.5–9.0 microns and an ether absorption at 10.15 microns.

Elemental analysis calculated for $C_{15}F_{17}H_{16}N_2O_2I$: C, 25.5; F, 45.7; H, 2.3; N, 4.0; I, 18.0. Found C, 25.4; F, 45.9; H, 2.4; N, 4.0; I, 18.1.

EXAMPLE 2

8-Heptafluoroisopropoxyperfluorooctyl iodide, $(CF_3)_2CFO(CF_2CF_2)_4I$, 49 parts, and 23 parts of liquid sulfur trioxide were reacted as in Example 1 at 130°–135°C. for 25 hours. The reaction pressure rose to 170–180 p.s.i.g. Upon fractional distillation of the products, 7.8 parts of the acid fluoride, $(CF_3)_2CFO(CF_2)_7COF$, having a boiling point of 70°C./25 mm. and 9.5 parts of the fluoropyrosulfate, $(CF_3)_2CFO(CF_2)_8OSO_2OSO_2F$ having a boiling point of 75°–77°C./2 mm. were obtained.

A mixture of 13.8 parts of the acid fluoride and 11.0 parts of the fluoropyrosulfate prepared as above was cooled to 0°C. and 28 parts of methanol added over a 20-minute period. The mixture was esterified by refluxing for 19 hours, cooling, and washing with ice water. The organic layer was separated, dried over anhydrous sodium sulfate, filtered and distilled under reduced pressure.

The methyl ester of 8-heptafluoroisopropoxyperfluoro-octanoic acid (17 parts) was obtained having a boiling point of 51°C./2 mm.

Fifteen parts of the methyl ester prepared as above were reacted with 2.57 parts of 3-(N,N-dimethylamino)propylamine dissolved in 13 parts of ether following the general procedure of Example 1.

An 88 percent yield (13 parts) of the corresponding amide, dimethylamino-n-propylperfluoro(isopropoxyheptan)amide having the formula

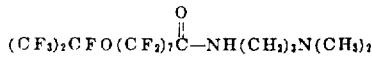

was obtained having a boiling point of 113–113.5°/2 mm.

The amide prepared as above (4.7 parts) was dissolved in a total of 59 parts by volume of ether and stirred with 2.01 parts of methyl iodide for three hours. The mixture was stirred for 17 hours, filtered and the solid product washed with ether and dried.

A 63 percent yield (3.6 parts) of the quaternary compound 3-[perfluoro(isopropoxyheptan)carboxamido]propyl trimethyl ammonium iodide having the formula

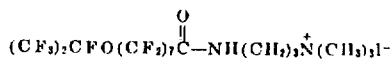

was obtained having a melting point of 140°–142.5°C. after recrystallizing from a mixture of benzene and ethanol. The structure was confirmed by infrared analysis.

Elemental analysis calculated for $C_{17}F_{21}H_{16}N_2O_2I$: C, 25.3; F, 49.5; H, 2.0; N, 3.5; I, 15.7. Found: C, 25.0; F, 49.8; H, 1.8; N, 3.3; I, 15.6.

EXAMPLE 3

4-Heptafluoroisoproxyperfluorobutyl iodide, $(CF_3)_2CFO(CF_2CF_2)_2I$ (22 parts) and 11 parts of liquid sulfur trioxide were reacted in a pressure vessel following the procedure as in Example 1 by heating at 110°C. for 24 hours. The organic layer was fractionally distilled to yield seven parts of the corresponding acid fluoride having a boiling point of 77°–79°C.

Fifteen parts of acid fluoride prepared as above were charged to a vessel containing 100 parts of ice water. A few drops of phenolphthalein indicator were added and the mixture titrated with aqueous KOH to form the potassium salt of the acid. The mixture was acidified with dilute sulfuric acid and the aqueous layer washed with ether. The combined ether extracts and organic layer were dried over anhydrous sodium sulfate and distilled under vacuum. The resultant free acid, 4-heptafluoroisopropoxyperfluorobutanoic acid, $(CF_3)_2CFO(CF_{2)3}COOH$, was esterified with methanol.

The methyl ester (80 parts) was reacted with 3-(N,N-dimethylamino)propylamine in 100 parts by volume of ether as in Example 1. The resultant amide, dimethylamino-n-propylperfluoro-(isopropoxypropan)amide

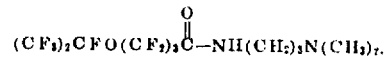

was obtained as a liquid having a boiling point of 108°–109°C./5 mm.

The amide prepared as above (24.6 parts) was reacted with 15.7 parts of methyl iodide following the procedure as in Example 1.

A 67 percent yield of 3-[perfluoro(isopropoxypropan)carboxamido]-propyl trimethyl ammonium iodide having the structure

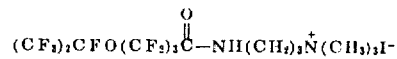

was obtained. The solid product was recrystallized from a mixture of benzene and alcohol and has a melting point of 152°–153°C. The structure was confirmed by infrared analysis.

Elemental analysis calculated for $C_{13}F_{13}H_{16}N_2O_2I$: C, 25.8; F, 40.7; H, 2.7; N, 4.6; I, 20.9. Found: C, 25.9; F, 41.9; H, 2.8; N, 4.6; I, 21.4.

EXAMPLE 4

Thirty parts of dimethylamino-n-propylperfluoro-(isopropoxymethan)amide of the formula

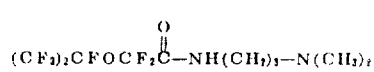

prepared in a manner analogous to that of the amide of Example 1, but substituting the appropriate iodide, was treated with 23.7 parts of methyl iodide.

A 98.8 percent yield (41.1 parts) of 3-[perofluoro(isopropoxymethan)-carboxyamido]propyl trimethyl ammonium iodide of the formula

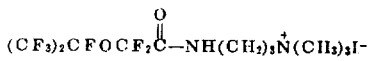

was obtained. The solid product was recrystallized from a mixture of benzene and ethanol and had a melting point of 153°–154.5°C.

Elemental analysis calculated for $C_{11}F_9H_{16}N_2O_2I$: C, 26.1; F, 33.8; H, 3.2; N, 5.5; I, 25.0. Found: C26.2; F, 33.9; H, 3.3; N, 5.3; I, 23.1.

EXAMPLE 5

A mixture of amides of the formula

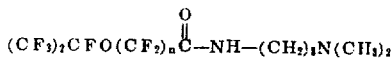

wherein $n$ is 3, 5, and 7, prepared as in Examples 1–3, were treated with 9.43 parts of methyl iodide.

A mixture of the corresponding quaternary compounds,

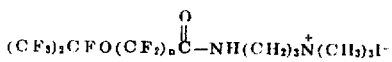

wherein $n$ is as defined above was obtained and 17.9 parts isolated.

EXAMPLE 6

A mixture of 8.2 parts of the amide prepared as in Example 1 and 1.3 parts of chloroacetic acid was heated at 150°C. for 10 minutes. A light brown gummy material (9.4 parts) was obtained on cooling to room temperature. One-half of the product was heated up to 159°C. and cooled. This product was darker in color. Each sample was extracted with ether and since they were apparently the same, were then combined.

An 85 percent yield (8.0 parts) of the quaternary compound carboxymethyldimethyl-3-[perfluoro(isopropoxypentan)carboxamido]-propyl ammonium chloride,

was obtained. The product was dried at 55°C. for 20 hours under vacuum.

Elemental analysis calculated for $C_{16}F_{17}H_{16}N_2O_4Cl$: C, 29.9; F, 49.0; H, 2.4; N, 4.3; Cl, 5.4. Found: C, 29.0; F, 48.5; H, 2.5; N, 4.6; Cl, 5.6.

Example 7

Thirty parts of the amide

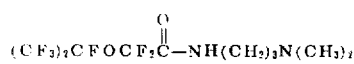

prepared as in Example 4 were treated with 7.76 parts of chloro-acetic acid and heated at 150°C. for 10 minutes.

A 91 percent yield (34.3 parts) of the corresponding quaternary compound, carboxymethyldimethyl-3-[3-perfluoro(isopropoxymethan)-carboxamido]propyl ammonium chloride,

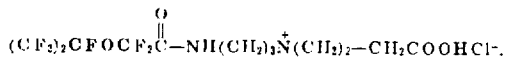

was obtained.

EXAMPLE 8

Dimethylamino-n-propylperfluoro(isopropoxypropan)amide (24.2 parts) as prepared in Example 3 was treated with 4.9 parts of chloroacetic acid as in Example 7.

A 90 percent yield (26 parts) of the desired product, carboxymethyldimethyl-3-[perfluoro(isopropoxypropan)carboxamido]propyl ammonium chloride,

was obtained. The structure was confirmed by infrared analysis.

Elemental analysis calculated for $C_{14}F_{13}H_{16}N_2O_4Cl$: C, 30.6; F, 45.1; H, 2.9; N, 5.1; Cl, 6.5. Found: C, 29.9; F, 51.0; H, 3.1; N, 4.9; Cl, 5.9.

EXAMPLE 9

The amide prepared as in Example 2 (5.08 parts) was treated with 0.72 part of chloroacetic acid as in Example 7.

A 91 percent yield (5.3 parts) of the desired product, carboxy-methyldimethyl-3-g[perfluoro(isopropoxyheptan)carboxamido]propyl ammonium chloride,

was obtained. The structure was confirmed by infrared analysis.

Elemental analysis calculated for $C_{18}F_{21}H_{16}N_2O_4Cl$: C, 28.5; F, 52.6; H, 2.1; N, 3.7; Cl, 4.7. Found: C, 27.8; F, 54.6; H, 2.2; N, 3.8; Cl, 4.7.

EXAMPLE 10

The amide mixture described in Example 5 (15 parts) was treated with 3.13 parts of chloroacetic acid as in Example 7.

A mixture of the desired quaternary products,

was obtained wherein $n$ is 3, 5 and 7, and 15.65 parts were isolated.

EXAMPLE 11

Hydrogen chloride was bubbled into a solution containing 25 parts by volume of ether and one part of the amide as prepared in Example 1. A white solid precipitated which was collected and washed with ether.

The desired product, 3-[perfluoro(isopropoxypentan)carboxamido]propyl dimethyl ammonium chloride (0.96 part),

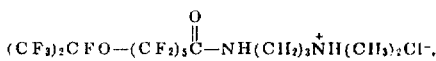

was obtained having a melting point of 120°–122°C. The structure was confirmed by infrared analysis.

Elemental analysis calculated for $C_{14}F_{17}H_{14}N_2O_2Cl$: C, 29.8; F, 57.2; H, 2.5; N, 5.0; Cl, 6.3. Found: C, 28.0; F, 53.6; H, 2.5; N, 4.8; Cl, 6.0.

EXAMPLE 12

Ten parts of the amide prepared as in Example 1 were heated to 150°C. in a nitrogen-purged reaction vessel. β-propiolactone (1.27 parts) was added dropwise over a 15-minute period while stirring, maintaining the temperature at 150°C. for 45 minutes more.

A viscous, water soluble product was obtained (9.74 parts) identified as carboxyethyldimethyl 3-[perfluoro(5-isopropoxypentan)-carboxamido]propyl ammonium hydroxide, inner salt having the structure

The structure was confirmed by infrared analysis which showed amide absorption at 3.0, 5.85, and 6.5 microns and carboxylate absorption at 6.25 microns.

Elemental analysis calculated for $C_{17}F_{17}H_{17}N_2O_4$: C, 32.2; F, 50.8; H, 2.7; N, 4.4. Found: C, 32.0; F, 50.8; H, 3.1; N, 4.2.

EXAMPLE 13

Following the general procedure of Example 12, 10.37 parts of β-propiolactone were added over about 85 minutes to 60 parts of the amide prepared as in Example 3 at 150°–155°C. Heating was continued for about 40 minutes longer.

A viscous, light brown, water soluble product was obtained (69.4 parts) identified as carboxyethyldimethyl 3-[perfluoro-(3-isopropoxypropan)carboxamido]propyl ammonium hydroxide, inner salt, having the formula

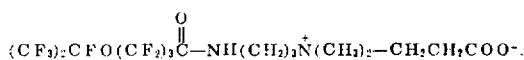

Elemental analysis calculated for $C_{15}F_{13}H_{17}N_2O_4$: C, 33.6; F, 4.1; H, 3.2; N, 5.2 Found: C, 34.3; F, 44.9; H, 3.4; N, 6.8.

EXAMPLE 14

Following the general procedure of Example 12, 1.8 parts of β-propiolactone were added to 15.0 parts of the amide prepared as in Example 2 at 148°–153°C. Heating was continued for about 40 minutes longer.

A viscous, amber liquid product was obtained which was soluble in water. The structure for carboxyethyldimethyl 3-[perfluoro(7-isopropoxyheptan)carboxamido]propyl ammonium hydroxide, inner salt having the formula

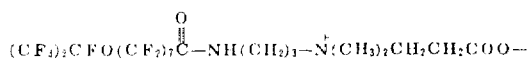

was confirmed.

Elemental analysis for $C_{19}F_{21}H_{17}N_2O_4$: C, 31.1; F, 54.2; H, 2.3; N, 3.8. Found: C, 31.9; F, 54.7; H, 2.2; N, 4.8.

EXAMPLE 15

An amide of the formula

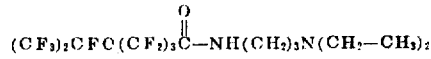

was prepared following the procedure set forth in Example 3, but substituting the appropriate polyamine reactant. Following the general procedure as in Example 12, 3.34 parts of β-propiolactone were reacted with 21 parts of the above-described amide at 150°–155°C. Carboxyethyldiethyl 3-[perfluoro(3isopropoxypropan)-carboxamido]propyl ammonium hydroxide, inner salt of the formula

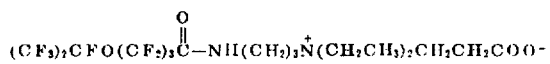

(23.7 parts) was obtained as a viscous product soluble in water. The structure was confirmed by infrared analysis.

Elemental analysis calculated for $C_{17}F_{13}H_{21}N_2O_4$: C, 36.2; F, 43.8; H, 3.8; N, 5.0. Found: C, 35.6; F, 44.0; H, 4.0; N, 6.0.

EXAMPLE 16

An amide of the formula

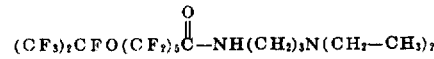

was prepared following the procedure of Example 1, but substituting the appropriate polyamine. Following the general procedure of Example 12, 86.1 parts of β-propiolactone were added to 650 parts of the amide as described at 149°–151°C. over 3 hours and 45 minutes. Heating was continued for 40 minutes longer. Carboxyethyldiethyl 3-[perfluoro(5-isopropoxypentan)-carboxamido] propyl ammonium hydroxide, inner salt of the formula

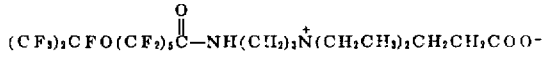

(722 parts) was obtained as a viscous, water soluble liquid. The structure was confirmed by infrared analysis.

Elemental analysis calculated for $C_{19}F_{17}H_{21}N_2O_4$: C, 34.4; F, 48.7; H, 3.2; N, 4.2. Found: C, 34.6; F, 47.7; H, 3.4; N, 5.4.

EXAMPLE 17

To a mixture of 18.5 parts of sodium cyanide in 117 parts of dimethylsulfoxide preheated to 60°C., 109 parts of $(CF_3)_2CFO(CF_2)_4(CH_2)_2I$ were added slowly. The temperature was maintained at 80°C. for 5 hours. After cooling to room temperature, the water-insoluble oil was separated, dried over sodium sulfate and distilled. $(CF_3)_2CFO(CF_2)_4(CH_2)_2CN$ was recovered having a boiling point of 99°–100°C./15 mm.

A mixture of 48.5 parts of the nitrile prepared as above and 75 parts by volume of 70 percent sulfuric acid was heated at 110°–120°C. for 5 hours and cooled. The phases were separated, the aqueous layer washed with ether and the ether combined with the organic layer. The product was dried and distilled.

$(CF_3)_2CFO(CF_2)_4(CH_2)_2COOH$ was obtained having a boiling point of 108°–110°C./4 mm. The corresponding methyl ester was prepared by reaction with methanol.

An amide corresponding to the formula

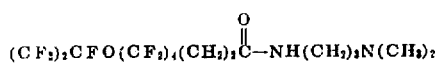

was obtained following the general procedure as in Example 1 except the mixture was heated at 68°–72° for 28 hours.

Following the general procedure as in Example 12, 2.62 parts of β-propiolactone were added to 18 parts of the amide described above at 149°–151°C. over a 20-minute period. Heating was continued for an additional 45 minutes.

Carboxyethyldimethyl 3-(6-heptafluoroisopropoxy-3,3,4,-4,5,5,6,6-octafluorohexancarboxamido)propyl ammonium hydroxide, inner salt having the formula

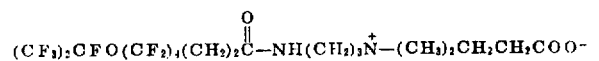

was obtained as a viscous, water soluble liquid. The structure was confirmed by infrared analysis.

Elemental analysis calculated for $C_{16}F_{15}H_{21}N_2O_4$: C, 35.2; F, 46.4; H, 3.4; N, 4.6. Found: C, 34.5; F, 46.6; H, 3.6; N, 4.6.

EXAMPLE 18

The amide prepared as in Example 1 (19.4 parts) was heated to 85°C. Molton γ-propanesultone (4.17 parts) was added over a 15-minute period and heating continued for 1 hour. The mixture became solid. The product was crushed and washed with ether and recrystallized from acetonitrile.

Dimethyl-3-sulfopropyl-3-[perfluoro(5-isopropoxypentan)carboxamido]propyl ammonium hydroxide, inner salt was obtained having the structure

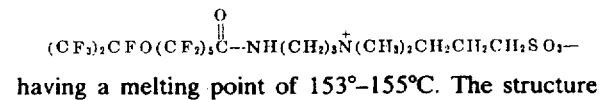

having a melting point of 153°–155°C. The structure was confirmed by infrared analysis which showed amide absorption at 2.98, 5.9 and 6.5 microns and sulfonate absorption at 9.62 microns.

Elemental analysis calculated for $C_{17}F_{17}H_{19}N_2O_5S$: C, 30.1; F, 47.0; H, 3.3; N, 4.7; S, 5.6. Found: C, 29.7; F, 47.0; H, 2.8; N, 4.1; S, 4.7.

EXAMPLE 19

An ester of the formula $(CF_3)_2CFO(CF_2)_5COOC_3H_7$ was prepared by esterifying the acid prepared as in Example 1 with propanol. Over a 10-minute period, 6.51 parts of 2-(β-methyl-(aminoethyl)pyridine was added to 25.0 parts of the ester at 40°C. The mixture was heated at 75°C. for 35 minutes. The product was fractionally distilled to yield 17.7 parts of 2-[N-methyl-5-perfluoro(isopropoxypentan)carboxamido]ethyl pyridine of the formula

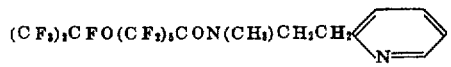

having a boiling point of 110°–111°C./0.2 mm., and melting point 28.5°–30°C.

A solution of 0.29 part of the amide described above in three parts by volume of ether was treated with three drops of 12N hydrochloric acid. The ether was evaporated, the product washed with petroleum ether and dried to yield 0.25 part of 2-[N-methyl-5-perfluoro(isopropoxypentan)carboxamido] ethyl pyridinium hydro-chloride of the formula

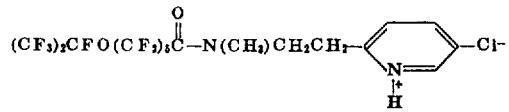

An aqueous solution of the compound foamed readily on shaking.

EXAMPLE 20

Compounds of the invention were tested as surface active agents by measuring the surface tension of aqueous solutions of the compounds at various concentrations at 25°C. according to ASTM Test D 1131–156 using a du Nouy tensiometer. The surface tension of water at 25°C. is 72 dynes/cm. The results are given below wherein surface tension is expressed in dynes/cm.

| Compound | Concentration, percent | Surface tension |
|---|---|---|
| $(CF_3)_2CFO(CF_2)_5\overset{O}{\overset{\|}{C}}-NH(CH_2)_3\overset{+}{N}(CH_3)_3I^-$ | 1.00 | 14.5 |
| | 0.50 | 14.5 |
| | 0.10 | 14.7 |
| | 0.05 | 22.9 |
| | 0.01 | 38.9 |
| $(CF_3)_2CFO(CF_2)_7\overset{O}{\overset{\|}{C}}-NH(CH_2)_3\overset{+}{N}(CH_3)_3I^-$ | 1.00 | 14.3 |
| | 0.50 | 14.2 |
| | 0.10 | 14.2 |
| | 0.05 | 14.2 |
| $(CF_3)_2CFO(CF_2)_3\overset{O}{\overset{\|}{C}}-NH(CH_2)_3\overset{+}{N}(CH_3)_3I^-$ | 1.00 | 18.5 |
| | 0.50 | 22.5 |
| | 0.10 | 45.0 |
| | 0.05 | 57.1 |
| $(CF_3)_2CFOCF_2\overset{O}{\overset{\|}{C}}-NH(CH_2)_3\overset{+}{N}(CH_3)_3I^-$ | 1.00 | 36.94 |
| | 0.50 | 43.87 |
| | 0.10 | 57.49 |
| | 0.05 | 61.77 |

Table—Continued

| Compound | | |
|---|---|---|
| $(CF_3)_2CFO(CF_2)_5C(=O)-NH(CH_2)_3\overset{+}{N}(CH_3)_2CH_2COOHCl^-$ | 1.00<br>0.50<br>0.10<br>0.05<br>0.01 | 14.8<br>14.7<br>15.2<br>16.2<br>17.1 |
| $(CF_3)_2CFOCF_2C(=O)-NH(CH_2)_3\overset{+}{N}(CH_3)_2CH_2COOHCl^-$ | 1.00<br>0.50<br>0.10<br>0.05 | 20.21<br>21.86<br>31.04<br>35.51 |
| $(CF_3)_2CFO(CF_2)_3C(=O)-NH(CH_2)_3\overset{+}{N}(CH_3)_2CH_2COOHCl^-$ | 1.00<br>0.50<br>0.10<br>0.05 | 17.4<br>16.8<br>16.5<br>22.1 |
| $(CF_3)_2CFO(CF_2)_7C(=O)-NH(CH_2)_3\overset{+}{N}(CH_3)_2CH_2COOHCl^-$ | 1.00<br>0.50<br>0.10<br>0.05 | 14.5<br>14.5<br>15.1<br>15.3 |
| $(CF_3)_2CFO(CF_2)_5C(=O)-NH(CH_2)_3\overset{+}{N}(CH_3)_2CH_2CH_2COO^-$ | 0.50<br>0.10<br>0.01 | 17.3<br>16.9<br>15.1 |
| $(CF_3)_2CFO(CF_2)_3C(=O)-NH(CH_2)_3\overset{+}{N}(CH_3)_2CH_2CH_2COO^-$ | 0.50 | 17.2 |
| $(CF_3)_2CFO(CF_2)_4(CH_2)_3C(=O)-NH(CH_2)_3\overset{+}{N}(CH_3)_2CH_2CH_2COO^-$ | 1.00<br>0.50<br>0.10<br>0.05<br>0.25 | 17.8<br>17.9<br>17.1<br>17.2<br>17.7 |
| $(CF_3)_2CFO(CF_2)_5C(=O)-NH(CH_2)_3\overset{+}{N}(CH_3)_2CH_2CH_2CH_2SO_3^-$ | 0.10<br>0.01 | 17.8<br>40.7 |

EXAMPLE 21

Compounds of the invention were tested as oil repellency agents for textiles as follows: samples of 80 × 80 cotton print cloth were soaked for 30–45 minutes in 1.0 percent aqueous solutions of the compounds. The treated fabric was then blotted and air dried for 18–65 hours.

The procedure employed in determining the oil repellency ratings is described in the Textile Research Journal, on pages 323–4 of April, 1962 edition. Drops of the mixtures of mineral oil ("Nujol") and n-heptane are gently placed on the treated fabrics. After three minutes the wetting and penetration of the fabric is observed visually. The number corresponding to the mixture containing the highest percentage of heptane which does not penetrate or wet the fabric is taken as the oil repellency rating of the treated fabric. A rating of about 90 or higher is considered excellent. The results are summarized below.

| Compound | Oil repellency rating |
|---|---|
| $(CF_3)_2CFO(CF_2)_7C(=O)-NH(CH_2)_3\overset{+}{N}(CH_3)_3I^-$ | 120 |
| $(CF_3)_2CFO(CF_2)_3C(=O)-NH(CH_2)_3\overset{+}{N}(CH_3)_3I^-$ | 80 |
| $(CF_3)_2CFO(CF_2)_5C(=O)-NH(CH_2)_3\overset{+}{N}(CH_3)_2CH_2COOHCl^-$ | 110 |
| $(CF_3)_2CFOCF_2C(=O)-NH(CH_2)_3\overset{+}{N}(CH_3)_2CH_2COOHCl^-$ | 70 |
| $(CF_3)_2CFO(CF_2)_3C(=O)-NH(CH_2)_3\overset{+}{N}(CH_3)_2CH_2COOHCl^-$ | 70 |
| $(CF_3)_2CFO(CF_2)_7C(=O)-NH(CH_2)_3\overset{+}{N}(CH_3)_2CH_2COOHCl^-$ | 120 |

Thus the compounds of the invention are effective oil repellents.

Further compounds illustrative of the present invention are prepared in analogous manner substituting the appropriate reactants and are useful surface active agents. The structures of these compounds are listed below:

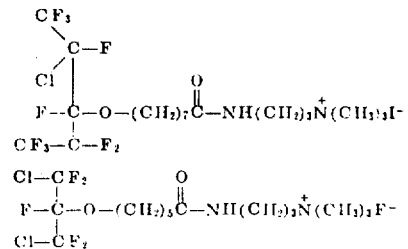

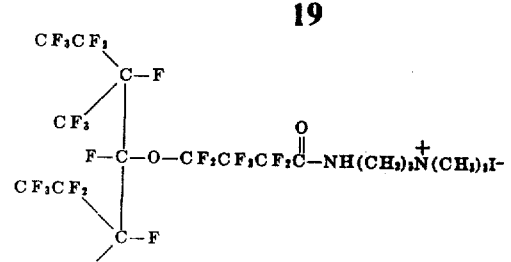
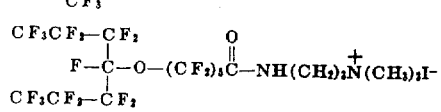
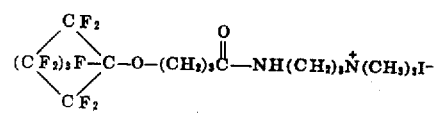
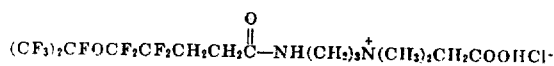
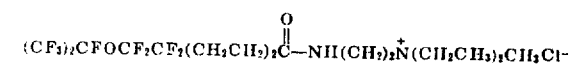
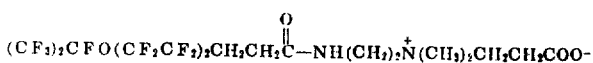
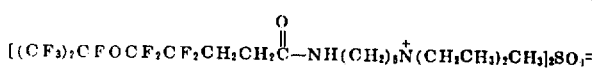
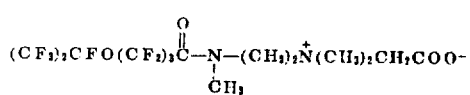
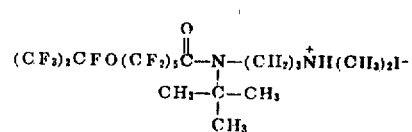
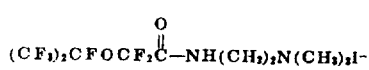
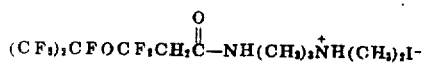
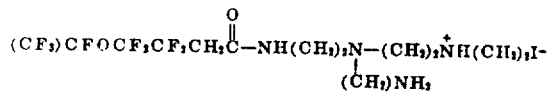
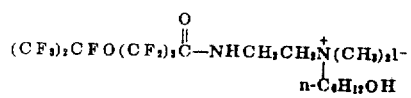
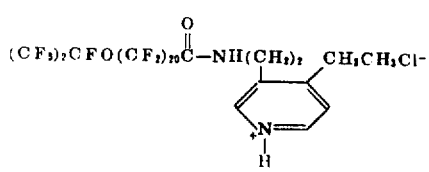

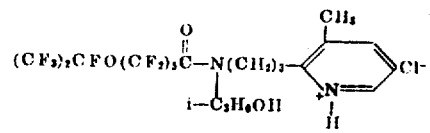
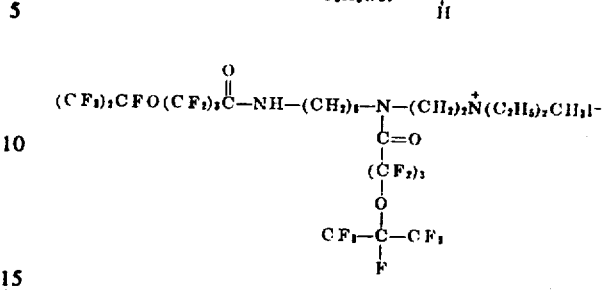
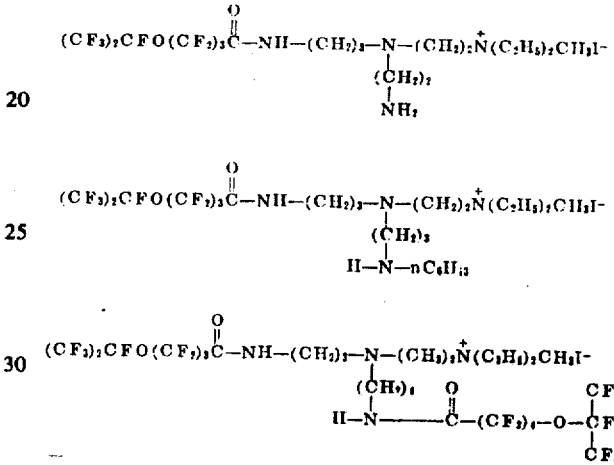

It will be apparent that numerous modifications and variations may be effected without departing from the novel concepts of the present invention and the illustrative details disclosed are not to be construed as imposing undue limitations on the invention.

We claim:

1. A compound of the formula

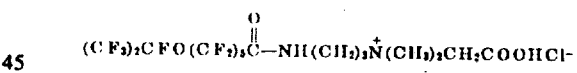

2. A compound of the formula

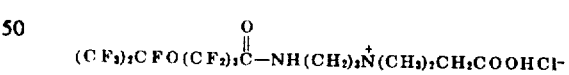

3. A compound of the formula

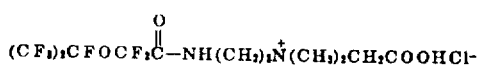

4. A compound of the formula

5. A compound of the formula

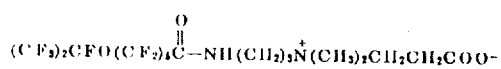

6. A compound of the formula
7. A compound of the formula
8. A compound of the formula
9. A compound of the formula
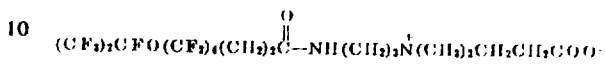
* * * * *